United States Patent
Kwon et al.

(10) Patent No.: US 8,816,714 B2
(45) Date of Patent: Aug. 26, 2014

(54) TESTING APPARATUS AND TESTING METHOD FOR LCD

(75) Inventors: Young Man Kwon, Beijing (CN); Sangjig Lee, Beijing (CN)

(73) Assignee: Beijing Boe Optoelectronics Technology Co., Ltd., Beijing (CN)

( * ) Notice: Subject to any disclaimer, the term of this patent is extended or adjusted under 35 U.S.C. 154(b) by 644 days.

(21) Appl. No.: 12/886,906

(22) Filed: Sep. 21, 2010

(65) Prior Publication Data
US 2011/0068816 A1 Mar. 24, 2011

(30) Foreign Application Priority Data

Sep. 24, 2009 (CN) .......................... 2009 1 0093466
Sep. 24, 2009 (CN) .......................... 2009 1 0093488

(51) Int. Cl.
*G01R 31/26* (2014.01)
(52) U.S. Cl.
USPC ............. 324/760.01; 324/756.01; 324/756.07
(58) Field of Classification Search
USPC ............. 324/756.01, 756.04, 756.07, 760.01
See application file for complete search history.

(56) References Cited

U.S. PATENT DOCUMENTS

| | | | |
|---|---|---|---|
| 6,246,253 B1 * | 6/2001 | Kang et al. | 324/750.25 |
| 6,809,544 B2 * | 10/2004 | Liao et al. | 324/760.01 |
| 7,399,965 B2 * | 7/2008 | Huang et al. | 250/310 |
| 7,777,828 B2 * | 8/2010 | Shim et al. | 349/58 |
| 7,800,568 B2 * | 9/2010 | Kang et al. | 345/87 |
| 7,889,311 B2 * | 2/2011 | Lee | 349/192 |
| 2003/0048396 A1 * | 3/2003 | Ishii et al. | 349/96 |
| 2004/0263202 A1 | 12/2004 | Iwata et al. | |
| 2007/0257698 A1 * | 11/2007 | Zhu et al. | 324/770 |
| 2010/0208163 A1 * | 8/2010 | Fuchikami et al. | 349/62 |

FOREIGN PATENT DOCUMENTS

CN 2784970 * 5/2006
CN 2784970 Y 5/2006

* cited by examiner

*Primary Examiner* — Hezron E Williams
*Assistant Examiner* — Hoang Nguyen
(74) *Attorney, Agent, or Firm* — Ladas & Parry LLP

(57) ABSTRACT

The present technology discloses a testing apparatus and a testing method for liquid crystal display (LCD). The apparatus comprises a testing chamber, at least one support device in the testing chamber and an adjusting device. The support device comprises a support stage located at the bottom of the testing chamber and a support rail located on a side wall of the testing chamber. The LCD is supported by the support stage and the support rail. The adjusting device is used to control the support rail to adjust angle of the LCD relative to the support stage.

7 Claims, 7 Drawing Sheets

TESTING APPARATUS AND TESTING METHOD FOR LCD

BACKGROUND

The present technology relates to liquid crystal display manufacturing, in particular, to a testing apparatus and a testing method for liquid crystal display (LCD).

LCD typically comprises a backlight module, optical films, light guide plates and reflectors. Conventional LCD does not have specific thickness requirement, thus the backlight module usually comprise light guide plates with relative large thickness (for example, 4 mm or more). Furthermore, conventional LCD may have back plates, which are typically made of metals and have relatively high stiffness, so that they can support the LCD and effectively prevent the light guide plates from being deformed in vertical direction. As thickness becomes a huge concern and thinner devices become popular in the LCD market, the thickness of LCD decreases. In this case, thinner light guide plates are employed, with a thickness between 1 mm and 2 mm, or even between 0.4 mm and 0.6 mm. Furthermore, in order to decrease the thickness of the backlight module, back plates are no longer adopted, instead there are only reflectors made of resins disposed on the back side of the light guide plates. It is difficult to use such reflectors with low stiffness to prevent the light guide plates from being deformed in the vertical direction during testing and handling of LCD. FIG. 1 shows the deformation of a light guide plate 52 and an optical film 51 disposed thereon during testing of LCD. As shown, the light guide plate 52 is bent by gravity, generating several spots A with uneven light transmission, which in turn cause uneven distribution of transmitted light across the optical film 51. Consequently, a testing apparatus and a testing method for LCD are desired to minimize the deformation of the light guide plate during testing.

BRIEF DESCRIPTION OF THE DRAWINGS

The present invention will become more fully understood from the detailed description given hereinafter and the accompanying drawings which are given by way of illustration only, and thus are not limitative of the present invention and wherein.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description According to the present technology, a testing apparatus for a liquid crystal display (LCD) may comprise a testing chamber, at least one support device and an adjusting device disposed in the chamber. The support device includes a support stage located at the bottom of the chamber and a support rail disposed on sidewall of the chamber. The LCD is supported by the support stage and the support rail. The adjusting device controls the support rail to adjust an angle between the liquid crystal display and the support stage.

Figure 1:
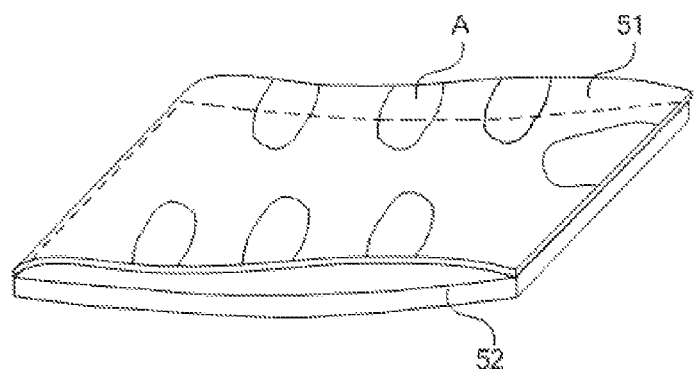
FIG. 1 is a schematic view showing deformation of light guide plate and optical film disposed on the light guide plate.
Figure 2:
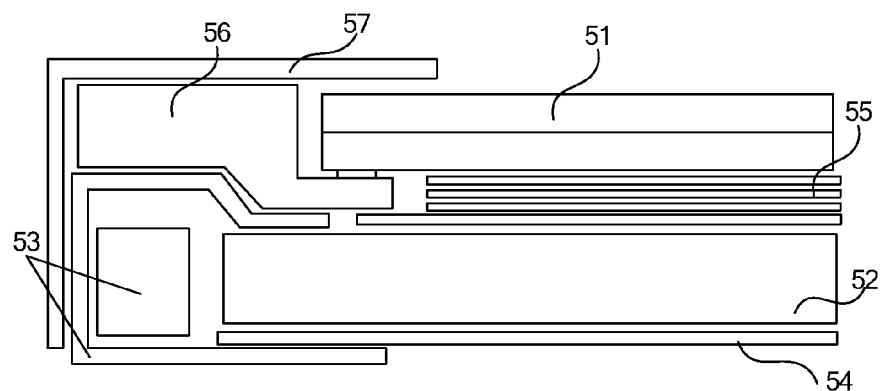
FIG. 2 is a schematic view of an exemplary structure of a LCD tested in this technology.

The testing apparatus for LCD according to the present technology can be applied to liquid crystal displays with various structures. FIG. 2 is a schematic view showing an exemplary structure of a LCD tested in this technology. As shown in FIG. 2, the LCD may comprise a LCD panel 51 and a backlight module. The backlight module may comprise light source 53, reflector 54, light guide plate 52, optical films 55 and module frame 56. The LCD may further include a frame 57. However, the LCD tested in this technology should not be limited to the above-mentioned structure.

Figure 3:
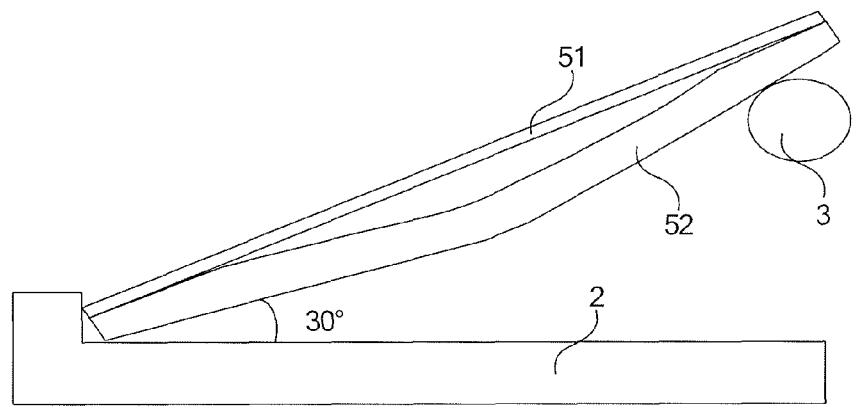
FIGS. 3-5 are schematic views showing different conditions of a LCD test in a testing apparatus according to this technology.
Figure 4:
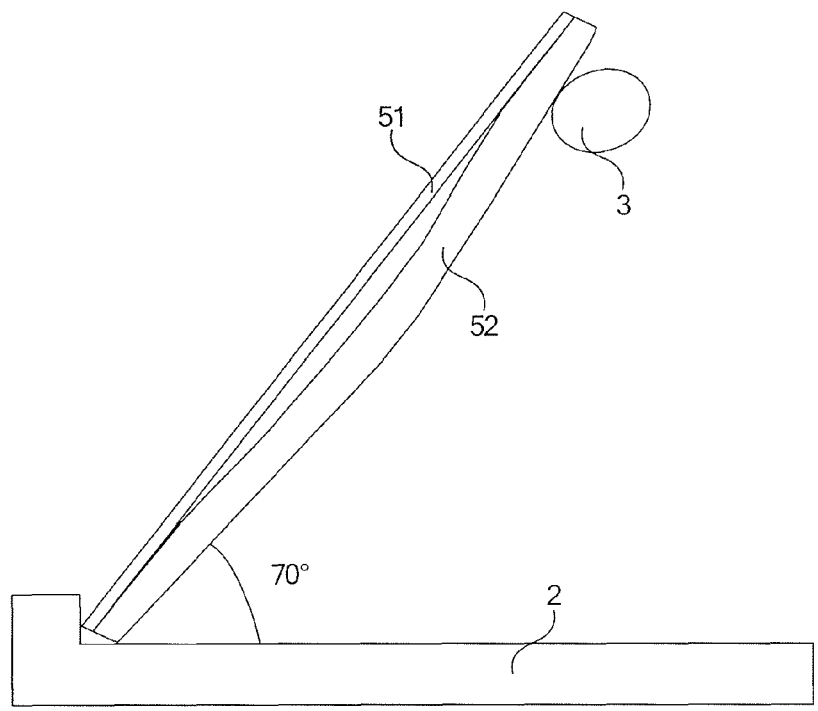
Figure 5:
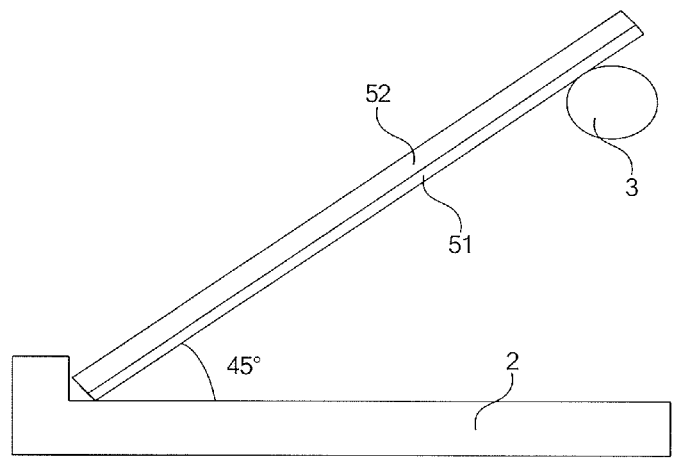

FIGS. 3-5 are schematic views showing different conditions of a LCD tested in a testing apparatus according to this technology. The apparatus according to this technology may comprise a testing chamber and at least one support device disposed in the testing chamber. The support device includes a support stage 2 and a support rail 3. The supporting stage 2 may have an L-shape cross-section. The LCD is placed on the support device in the testing chamber with LCD panel 51 above the light guide plate 52. The adjusting device (not shown) may adjust the support rail 3 so as to adjust an angle between the LCD and the support stage 2. The angle shown in FIG. 3 is 30 degrees while it is 70 degrees in FIG. 4. Furthermore, it is also possible to flip the LCD and place it on the support device, with the LCD panel 51 beneath the light guide plate 52, then adjust the support rail 3 to make the angle between the LCD and the support stage as 45 degrees, as shown in FIG. 5.

The LCDs tested in the above mentioned three conditions are subjected to same high temperature and high humidity for 72 hours, respectively. The test results of the optical films are shown in TAB.1.

TABLE 1

| conditions of LCD | Result(Level) |
| --- | --- |
| FIG. 3 | L3.5 |
| FIG. 4 | L2.5 |
| FIG. 5 | L0 |

Wherein, level L0 to L5 are defined as following:

L0: No wrinkle in optical film;

L1: Very few wrinkles in optical film;

L2: Few wrinkles in optical film, but still at an acceptable level;

L3: Noticeable wrinkles in optical film, to an extent which affect image quality of LCD;

L4: Serious wrinkle problem observed in optical film, causing LCD not sellable; and L5: Severe wrinkles observed in optical film.

Consequently, when there is an angle between LCD and the support stage, the light guide plate would be bent due to gravity. Bending of the light guide plate increases as the angle between LCD and the support stage decreases, thus the wrinkle problem in the optical film becomes more severe.

During testing of LCD, it is often required to observe image quality of LCD during or after testing runs. During observation, it is necessary to adjust the angle between the LCD and the support stage to be smaller in order to have a better view on LCD for the operator, such as 30 degree shown in FIG. 3. However, if the LCD is tested for a long time, for example, the LCD is subjected to an aging testing in a high temperature high humidity environment, the LCD shown in FIG. 3 would suffer severe bending. In this case, the adjusting device of the testing apparatus according to this technology may set the LCD at a relatively large angle relative to support stage (for example, 70 degrees to 90 degrees, as shown in FIG. 4) during test runs for minimizing the bending of the light guide plate, whereas readjust the LCD at a smaller angle relative to the support stage during observation by an operator (for example 30 degrees to 60 degrees, as shown in FIG. 3).

As shown in FIG. 5, since the LCD is flipped, the light guide plate is located above the LCD panel, thus there is no bending of light guide plate due to the support by the LCD panel. Consequently, no wrinkle is observed in the optical film. However, the LCD panel faces downward, which can not be observed conveniently.

Figure 6:
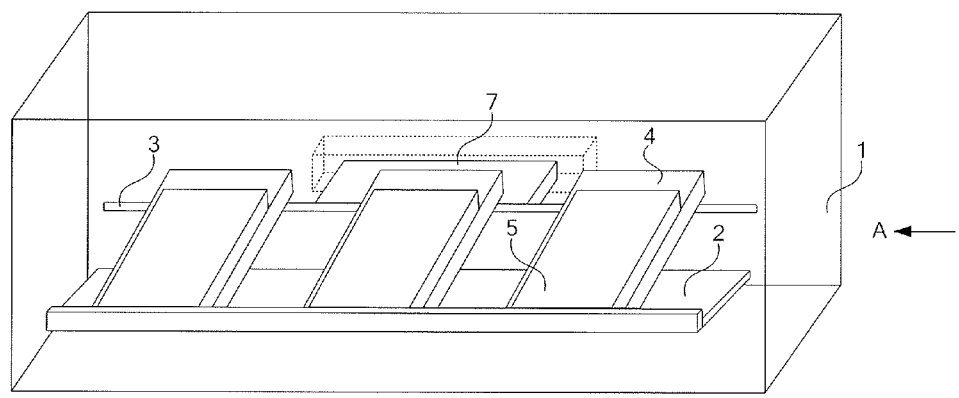
FIG. 6 is a schematic view showing a testing apparatus for LCD according to one embodiment of this technology.
Figure 7:
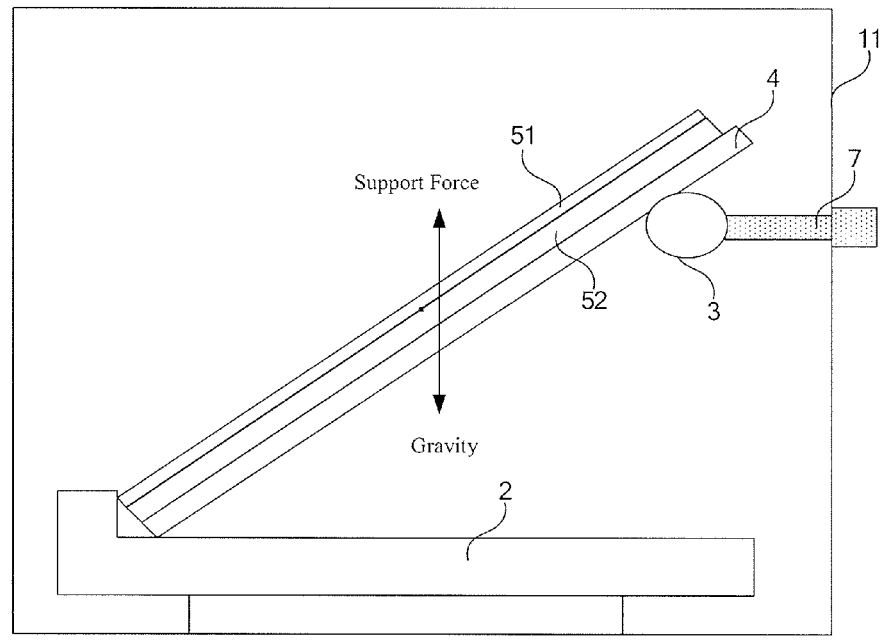
FIG. 7 is a side view of FIG. 6 seen in A direction.

FIG. 6 is a schematic view showing a testing apparatus for LCD according to one embodiment of this technology; and FIG. 7 is a side view of FIG. 6 seen in A direction. As shown in FIG. 6 and FIG. 7, the testing apparatus comprises a testing chamber 1, at least one support device disposed in the testing chamber 1 and a support member 4 disposed on the support device.

The testing chamber 1 may be used to perform testing runs on LCD therein. In particular, reliability tests may be performed in the testing chamber 1. The LCD 5 comprises a LCD panel 51 and a backlight module beneath the LCD panel 51. In the present embodiment, the backlight module is only represented by the light guide plate 52.

The support device is used to support LCD at a desired angle relative to the support stage. In particular, the support device may comprise a support stage 2 and a support rail 3 located above the support stage 2. Furthermore, the testing apparatus further comprises an adjusting device 7 located on the back sidewall 11 of the chamber 1. The adjusting device 7 is installed partially inside the chamber 1, and partially outside the chamber 1. The part of adjusting device 7 outside the testing chamber 1 is indicated by dash lines in FIG. 6. The support rail 3 is connected with the adjusting device 7. The support stage 2 is used to support the support member 4. The adjusting device 7 is used to adjust support rail 3 in order to support the support member 4 at a desired angle. In particular, the position of support rail 3 can be adjusted by moving the adjusting device 7 located on sidewall 11 in the vertical direction, so that the support member 4 placed against the support rail 3 has a desired angle relative to the support stage 2. The adjusting device 7 may be controlled by a computer and driven by a motor. Alternatively, the adjusting device may also be controlled manually. In the present embodiment, the set angle may be between 30 degree and 60 degree, preferably 45 degree. It is convenient for the operator to observe LCD during the reliability test with LCD set at the above-described angle. The angle may be readily adjusted by changing the position of support rail 3 using adjusting device 7. In the present embodiment, only one support device (i.e., support stage 2 and support rail 3) is illustrated, however, multiple support devices may be used to meet specific needs in practice. Also, each support stage 2 and support rail 3 may support at least one LCD 5. In FIG. 6, as one example, three LCDs 5 are supported by the support stage 2 and the support rail 3.

The support member 4 is used to support LCD 5. In particular, the support member 4 may meet the following requirements: the maximum bending deformation of the support member 4 is between 0 mm to 0.5 mm during reliability test of LCD 5 inside the chamber 1. In other words, the support member 4 has a bending deformation less than 0.5 mm, preferably no deformation during the reliability test. In this case, the support member 4 can provide sufficient support force for the light guide plate 52 in the LCD 5. In the present embodiment, the support member 4 may be made of polymethyl methacrylate (PMMA).

As shown in FIG. 7, the support member 4 can provide an upward support force during reliability test, which can partially or completely counter the gravity of the light guide plate 52. Consequently, the extent of the bending of light guide plate 52 in LCD 5 due to gravity can be effectively decreased, therefore the wrinkles in the optical film due to the bending of light guide plate can be reduced. Particularly, when this support force can completely counter the gravity of the light guide plate 52, the wrinkle problem in the optical film due to bending of the light guide plate can be avoided. Furthermore, the testing apparatus according to this technology can simulate the working condition of a LCD in actual environment during the reliability test, so that the manufacturers integrating those LCDs can reduce development cost by avoiding unnecessary changes of product design as well as budget increase and delays due to such design changes.

Figure 8:
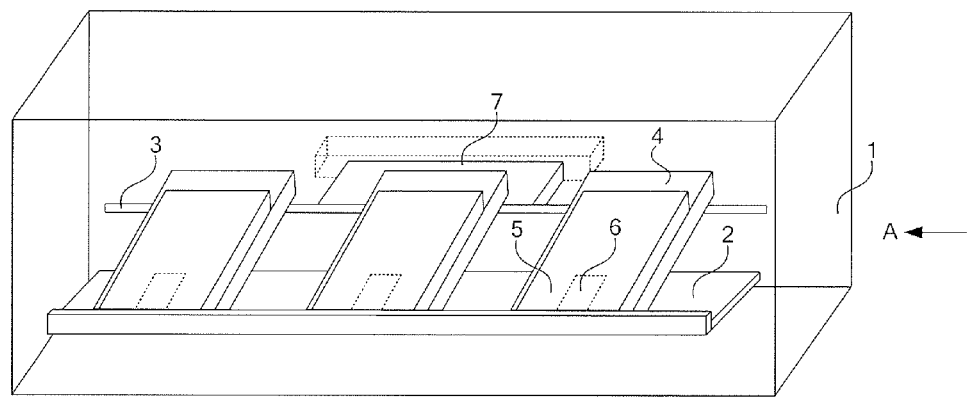
FIG. 8 is a schematic view showing a testing apparatus for LCD in another embodiment according to this technology.
Figure 9:
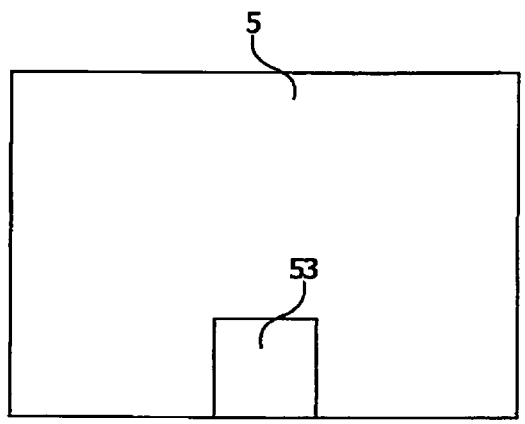
FIG. 9 is a back side view of the LCD shown in FIG. 8.
Figure 10:
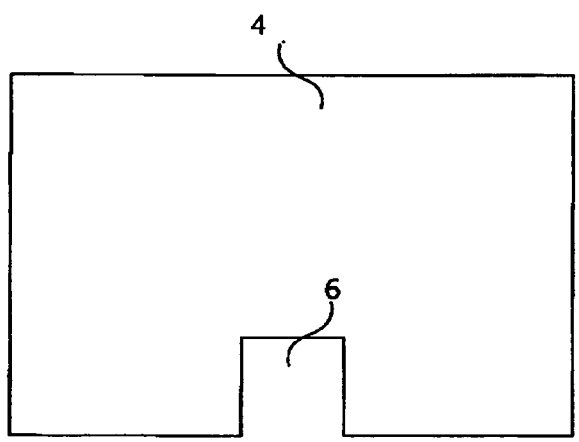
FIG. 10 is a plane view of a support device shown in FIG. 8.

FIG. 8 is a schematic view showing a testing apparatus for LCD in another embodiment according to this technology. FIG. 9 is a back side view of the LCD shown in FIG. 8. FIG. 10 is a plane view of a support device shown in FIG. 8. As shown in FIG. 8, FIG. 9 and FIG. 10, the support member 4 further comprise a groove 6. The groove 6 corresponds to the cable connection part 53 of LCD 5 in order to receive the cable connecting part 53. In FIG. 8, the groove 6 is indicated by a dashed box since the support member 4 is beneath the LCD 5.

In particular, as shown in FIG. 9, a cable connecting part 53 might be present on the back side of LCD 5, thus protruding from the back side of LCD 5. In this case, when the LCD 5 is placed on the support member 4, it can not rest squarely on the support member due to the protruded cable connection part 53, which might adversely affect the supporting effect. Thus, the groove 6 may be provided in the support member 4 so that the shape and dimensions of the groove may correspond to those of the cable connecting part 53.

When the LCD 5 is placed on the support member 4, the cable connecting part 53 of LCD 5 can fit into the groove 6. Thus the LCD 5 can be placed reliably on the support member 4, avoiding adverse effect due to the protruded cable connecting part 53.

Figure 11:
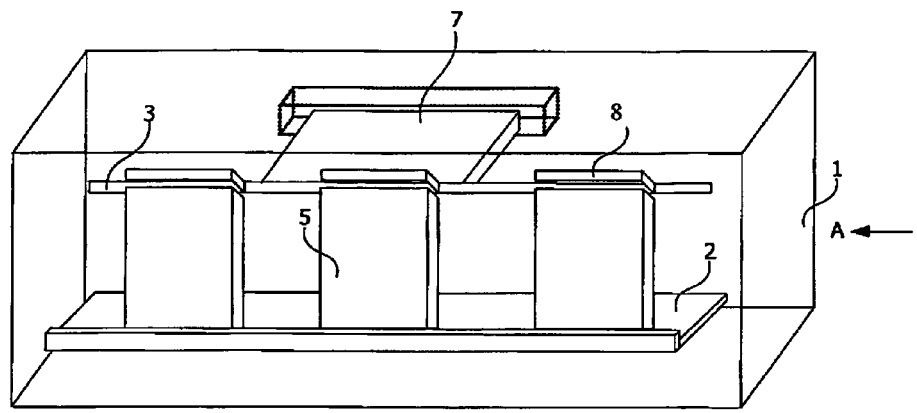
FIG. 11 is a schematic view showing a testing apparatus for LCD according to yet another embodiment of this technology.
Figure 12:
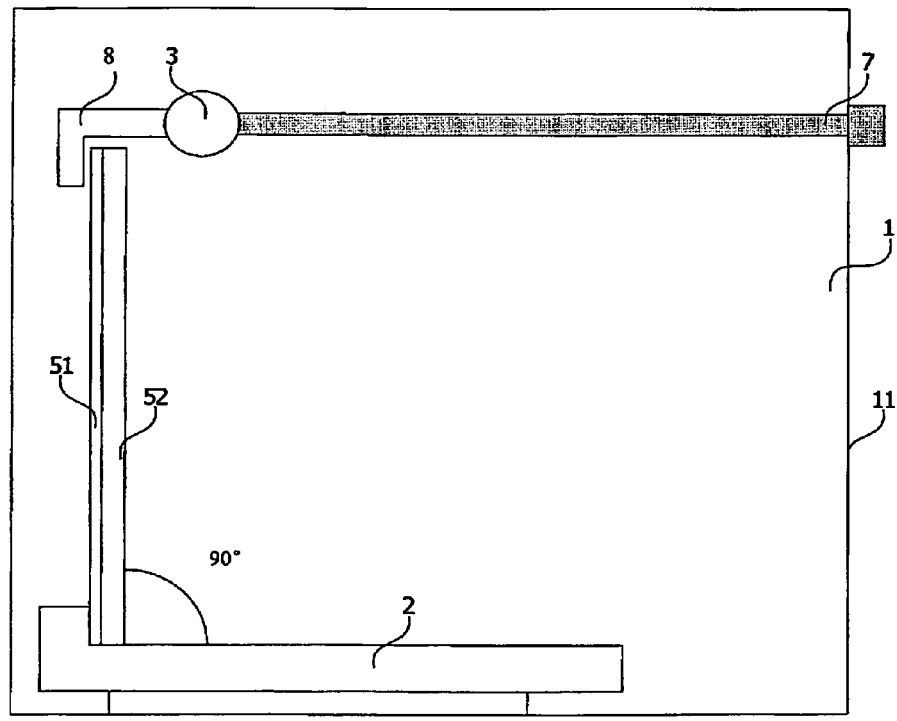
FIG. 12 is a side view of FIG. 11 seen in A direction.

FIG. 11 is a schematic view showing a testing apparatus for LCD according to yet another embodiment of this technology. FIG. 12 is a side view of FIG. 11 seen in A direction.

In the present embodiment, the angle of the LCD relative to the support stage during testing is preferably 90 degree. Since the LCD 5 stands vertically on the support stage 2, the bending of the light guide plate 52 in LCD 5 due to gravity is minimized, which consequently reduce the wrinkle problem in the optical film due to the bending of the light guide plate.

Furthermore, a blocking member 6 may further be provided by connecting to the support rail 3. The blocking member 6 is used to prevent the LCD 5 from tilting over when the LCD is set at the upright position. In the present embodiment, the blocking member 6 may have an L-shape cross-section, as shown in FIG. 12.

Figure 13:
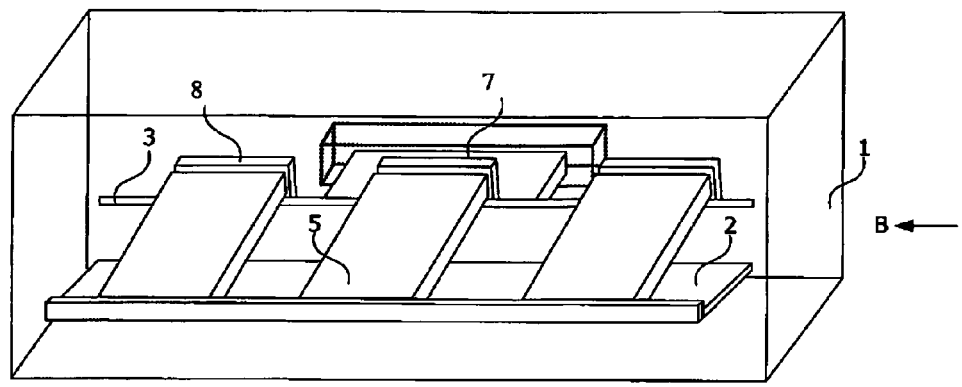
FIG. 13 is a schematic view showing a testing apparatus for LCD in yet another embodiment of this technology.
Figure 14:
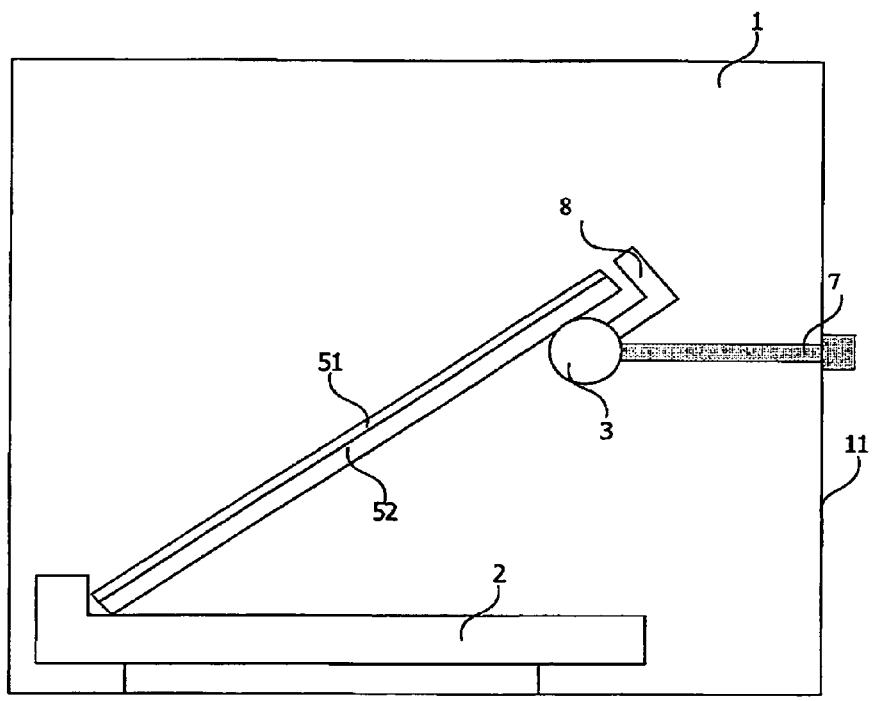
FIG. 14 is a side view of FIG. 13 seen in A direction.

FIG. 13 is a schematic view showing a testing apparatus for LCD in yet another embodiment of this technology, and FIG. 14 is a side view of FIG. 13 seen in A direction. As shown in FIG. 13 and FIG. 14, the adjusting device 7 is used to adjust the angle of the LCD 5 relative to support stage 2 by changing the position of support rail 3 for observation of image quality of LCD. In particular, such angle may be between 30 degree and 60 degree; preferably 45 degree.

In the present embodiment, the adjusting device can set LCD to stand on the support stage vertically with an angle relative to the support stage to be 90 degree. The bending of the light guide plate 52 in LCD 5 due to gravity is thus minimized during the reliability test, which consequently reduce the wrinkle problem in the optical film due to such bending, and reduce inhomogeneity of optical film due to such wrinkles, which in turn improves the image quality of LCD. Furthermore, the adjusting device can change the angle of LCD relative to the support stage so as to facilitate observation of image quality of LCD by the operator.

This technology also discloses a testing method for LCD. The testing method can employ the above-described testing apparatus.

The testing method according to this technology employs the above-described testing apparatus. The testing method comprises following steps. A LCD is placed on the support stage and the support rail. An angle of the LCD relative to the support stage is set as a first angle during testing of the LCD. An angle of the LCD relative to the support stage is set as a second angle during observation of the LCD. The first angle is larger than the second angle.

In the testing method according to the present embodiment, a support member can also be placed on the support device to further support LCD. The support member can provide the light guide plate with upward force to partially or completely counter the gravity of the light guide plate. Consequently, the bending of the light guide plate due to gravity is decreased, which effectively reduce the wrinkle problem in the optical film due to the bending of the light guide plate. Furthermore, the testing method according to this technology can simulate the working condition of a LCD in actual environment during the reliability test, so that the manufacturers integrating those LCDs can reduce development cost by avoiding unnecessary changes of product design as well as budget increase and delays due to such design changes.

The invention being thus described, it will be obvious that the same may be varied in many ways. Such variations are not to be regarded as a departure from the spirit and scope of the invention, and all such modifications as would be obvious to those skilled in the art are intended to be included within the scope of the following claims.

What is claimed is:

1. A testing method of a liquid crystal display (LCD) using an apparatus comprising:
    a testing chamber;
    at least one support device in the testing chamber, the support device comprising a support stage located at the bottom of the testing chamber and a support rail located on a side wall of the testing chamber,
    an adjusting device for controlling the support rail to adjust angle of the LCD relative to the support stage, and
    a support member placed on the supporting stage and the support rail;
    the method comprising following steps:
    placing the LCD on the support member, and the LCD being supported by the support stage and the support rail; and
    testing the LCD inside the testing chamber;
    wherein the angle of the LCD relative to the support stage is set as a first angle between 70 degree and 90 degree during testing of the LCD by the adjusting device inside the testing chamber, and the angle of the LCD relative to the support stage is set as a second angle between 30 degree and 60 degree during observation of the LCD by the adjusting device inside the testing chamber, and the bending deformation of the support member is between 0 mm to 0.5 mm during testing.

2. The testing method according to claim 1, wherein the support member further comprises a groove corresponding to a cable connecting part of the LCD for accommodate the cable connecting part.

3. The testing method according to claim 1, wherein the support member comprises polymethyl methacrylate (PMMA).

4. The testing method according to claim 1, further comprising a blocking member connected to the support rail, wherein the block member is used to prevent the LCD from tilting over when the angle of the LCD relative to the support stage is 90degree.

5. The testing method according to claim 4, wherein the blocking member has an L-shape cross-section.

6. The testing method according to claim 1, wherein the supporting stage has an L-shape cross-section.

7. The testing method according to claim 1, wherein the adjusting device adjusts the angle of the LCD relative to the support stage by controlling the position of the support rail on the sidewall.

* * * * *